United States Patent [19]
New

[11] Patent Number: 5,956,748
[45] Date of Patent: Sep. 21, 1999

[54] ASYNCHRONOUS, DUAL-PORT, RAM-BASED FIFO WITH BI-DIRECTIONAL ADDRESS SYNCHRONIZATION

[75] Inventor: Bernard J. New, Los Gatos, Calif.

[73] Assignee: Xilinx, Inc., San Jose, Calif.

[21] Appl. No.: 08/791,317

[22] Filed: Jan. 30, 1997

[51] Int. Cl.[6] .................................................. G11C 7/00
[52] U.S. Cl. ...................... 711/149; 711/131; 365/230.05
[58] Field of Search .................................. 711/149, 131; 365/230.05, 221; 345/518, 514

[56] References Cited

U.S. PATENT DOCUMENTS

| | | | |
|---|---|---|---|
| 4,873,703 | 10/1989 | Crandall et al. | 375/371 |
| 4,888,741 | 12/1989 | Malinowski | 365/230.05 |
| 5,345,419 | 9/1994 | Fenstermaker et al. | 365/189.04 |
| 5,365,485 | 11/1994 | Ward et al. | 365/221 |
| 5,408,673 | 4/1995 | Childers et al. | 711/149 |
| 5,555,524 | 9/1996 | Castellano | 365/221 |
| 5,640,528 | 6/1997 | Harney et al. | 711/206 |

*Primary Examiner*—Tod R. Swann
*Assistant Examiner*—Felix B. Lee
*Attorney, Agent, or Firm*—Edel M. Young; E. Eric Hoffman, Esq.

[57] ABSTRACT

A memory system having a dual port first in, first out (FIFO) memory which performs read operations in synchronism with a read clock signal and write operations in synchronism with a write clock signal. The read clock signal is asynchronous with respect to the write clock signal. A synchronizing engine is provided to synchronize a current write address with the read clock signal, thereby creating a synchronized write address. The synchronizing engine further synchronizes a current read address with the write clock signal, thereby creating a synchronized read address. The synchronized write address is compared to the current read address to determine if a FIFO empty condition exists. Similarly, the synchronized read address is compared to the current write address to determine if a FIFO full condition exists.

23 Claims, 4 Drawing Sheets

ASYNCHRONOUS, DUAL-PORT, RAM-BASED FIFO WITH BI-DIRECTIONAL ADDRESS SYNCHRONIZATION

FIELD OF THE INVENTION

The present invention relates to an asynchronous dual-port first in, first out (FIFO) memory and a method of operating the same.

BACKGROUND OF THE INVENTION

FIG. 1 is a block diagram of a conventional asynchronous FIFO memory system 100. Memory system 100 includes dual-port memory 101, which receives input data values at write port 102 and provides output data values at read port 103. FIFO memory system 100 also includes write address counter 104, read address counter 105, comparator 106, and is controlled by write control circuit 108 and read control circuit 109. Write port 102 and read port 103 can be accessed simultaneously. Write address counter 104 and read address counter 105 provide write and read addresses, respectively, to FIFO memory 101. Write and read control circuits 108 and 109 enable write and read operations by enabling write and read address counters 104 and 105 to increment their respective addresses. Write address counter 104 is clocked by a write clock (WCLK) signal, and read address counter 105 is clocked by a read clock (RCLK) signal. The WCLK and RCLK signals are unrelated signals which have different frequencies and/or phases with respect to one another. The asynchronous operation of memory system 100 is well-known in the art.

To assure proper operation of memory system 100, FULL and EMPTY flags are generated when FIFO memory 101 is full and empty, respectively. Comparator 106 provides a FULL flag to write control circuit 108 and an EMPTY flag to read control circuit 109 to report the empty and full conditions. Write control circuit 108 will not initiate write operations when comparator 106 asserts a FULL flag. Similarly, read control circuit 109 will not initiate read operations when comparator 106 asserts an EMPTY flag. Comparator 106 generates the FULL and EMPTY flags by comparing the write address from write address counter 104 with the read address from read address counter 105. When a write operation results in equality of the read and write addresses, FIFO memory 101 is full, and comparator 106 asserts a FULL flag. When a read operation results in equality of the read and write addresses, FIFO memory is empty, and comparator 106 asserts an EMPTY flag.

Comparator 106 can perform a reliable comparison only after the read and write addresses have been synchronized with a common clock signal. Thus, the read address can be synchronized with the WCLK signal, and the comparison can be performed in synchronism with the WCLK signal. Alternatively, the write address can be synchronized with the RCLK signal, and the comparison can be performed in synchronism with the RCLK signal.

For purposes of illustration, comparator 106 is connected to receive the WCLK signal, and the read address is synchronized with the WCLK signal. Comparator 106 compares the write and read addresses on each rising edge of the WCLK signal. In memory system 100, write operations are capable of proceeding at full speed because, after each write operation, comparator 106 immediately determines whether FIFO memory 101 is full. The FULL flag may be asserted unnecessarily based on the synchronization latency which exists between the incrementing of the read address counter 105 and the rising edge of the WCLK signal. For example, the FULL flag can be erroneously asserted when a read operation (which would cause FIFO memory 101 to be not full) occurs immediately prior to a write operation, but this read operation is not recorded by the comparator 106 because of the synchronization latency. The erroneous assertion of the FULL flag does not result in the destruction of data values within FIFO memory 101. Rather, the erroneous FULL flag prevents FIFO memory 101 from being filled to its maximum capacity until after the synchronization latency expires. Loss of performance is only experienced when FIFO memory 101 is within a few data values of being full.

In contrast, read operations cannot be performed at full speed. Performance is always degraded for read operations because read control circuit 109 must wait for comparator 106 to generate the EMPTY flag each time read address counter 105 is incremented. Each time that read address counter 105 is incremented, the new read address must be synchronized to the WCLK signal within comparator 106. The new read address must then be compared to the current write address within comparator 106, and the result (empty or not empty) must be re-synchronized to the RCLK signal and provided to the read control logic. Both of these synchronization operations inevitably incur latency.

If a read operation is performed when FIFO memory 101 is empty, an erroneous data value will be read. In addition, the next data value written into FIFO memory 101 will be lost because read address counter 105 was improperly incremented to read the erroneous data value. Potentially, the erroneous read operation could prevent the EMPTY flag from being properly asserted even after the synchronization latency period. In order to prevent such erroneous operation, the read operation must be delayed until the synchronization issues have been resolved. Therefore, the synchronization latency introduces an operation latency within the FIFO memory 101.

It would therefore be desirable to have an asynchronous FIFO memory which is capable of performing both read and write operations with minimal operation latency.

SUMMARY

Accordingly, the present invention provides a memory system having a dual port first in, first out (FIFO) memory which performs read operations in synchronism with a read clock signal and write operations in synchronism with a write clock signal. The read clock signal is asynchronous with respect to the write clock signal. A synchronizing engine is provided to synchronize the current write address with the read clock signal, thereby creating a synchronized write address. The synchronizing engine further synchronizes the current read address with the write clock signal, thereby creating a synchronized read address.

A first comparator is coupled to receive the current read address and the synchronized write address. The first comparator determines whether the current read address equals the synchronized write address. An empty flag generation circuit, which is coupled to the first comparator, generates an EMPTY flag signal when the current read address equals the synchronized write address as a result of a read operation within the FIFO memory.

A write address synchronization latency exists during the time that the current write address is synchronized with the read clock signal to create the synchronized write address. This write address synchronization latency can cause the synchronized write address to lag the current write address. As a result, the empty flag generation circuit may temporarily generate an unnecessary EMPTY flag signal. Unnecessarily generating the EMPTY flag introduces a slight operating latency (time for an input signal to be processed and affect an output signal), but does not result in the destruction of data values within the FIFO memory. An unnecessarily asserted EMPTY flag temporarily prevents one or more of the last data values from being read from the FIFO memory while the flag is asserted. Advantageously, the write address synchronization latency only results in an operating latency when the FIFO memory is almost empty.

A second comparator is coupled to receive the current write address and the synchronized read address. The second comparator determines whether the current write address equals the synchronized read address. A FULL flag generation circuit, which is coupled to the second comparator, generates a FULL signal when the current write address equals the synchronized read address as a result of a write operation within the FIFO memory.

A read address synchronization latency exists during the time that the current read address is synchronized with the write clock signal to create the synchronized read address. This read address synchronization latency can cause the synchronized read address to lag the current read address. As a result, the full flag generation circuit may unnecessarily generate the FULL flag signal. Unnecessarily generating the FULL flag signal introduces a slight delay before delay can be entered, but does not result in the destruction of data values within the FIFO memory. An unnecessarily asserted FULL flag temporarily prevents the FIFO memory from being completely filled. Advantageously, the read address synchronization latency only results in a delay entering data when the FIFO memory is almost full.

The current invention therefore permits write and read operations to both proceed at full speed except for occasional unnecessary delays when the FIFO memory is almost full or almost empty. These unnecessary delays only occur when the FIFO memory would actually be either full or empty except for one or two operations that have occurred within the write or read synchronization periods. The delays are only for the latency period, and the FIFO memory can be fully filled or emptied once the erroneous FULL or EMPTY flags have self-corrected.

The present invention also includes a method of operating a dual port FIFO memory which includes the steps of: (1) performing read operations in the FIFO memory in synchronism with a read clock signal, (2) performing write operations in the FIFO memory in synchronism with a write clock signal, wherein the read clock signal is asynchronous with respect to the write clock signal, (3) synchronizing the current write address with the read clock signal to create a synchronized write address, (4) synchronizing the current read address with the write clock signal to create a synchronized read address, (5) comparing the synchronized write address with the current read address, (6) generating a first flag signal if the synchronized write address equals the current read address as a result of a read operation, (7) comparing the synchronized read address with the current write address, and (8) generating a second flag signal if the synchronized read address equals the current write address as a result of a write operation.

The present invention will be more fully understood in view of the following detailed description taken together with the drawings.

DETAILED DESCRIPTION

Figure 1:
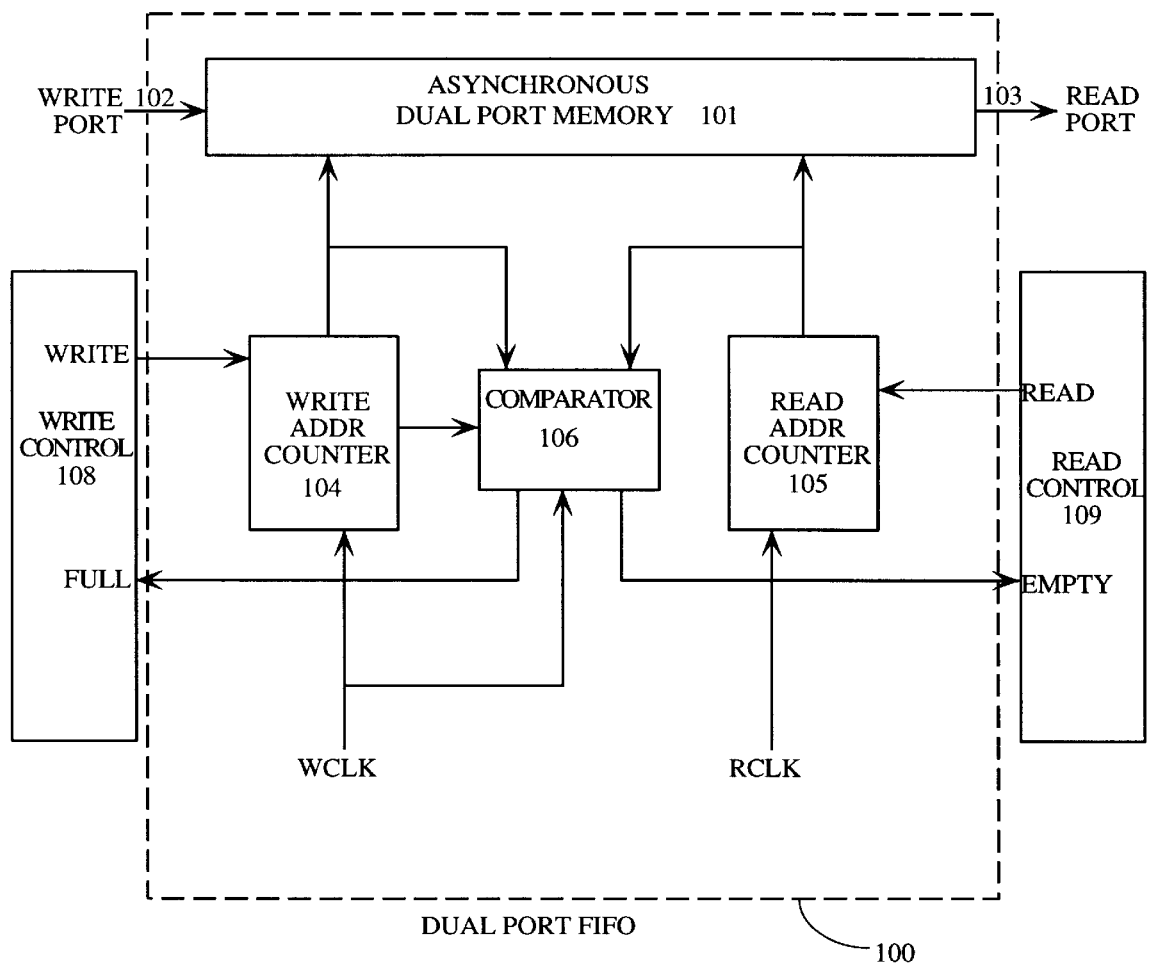
FIG. 1 is a block diagram of a conventional asynchronous dual port memory system.
Figure 2:
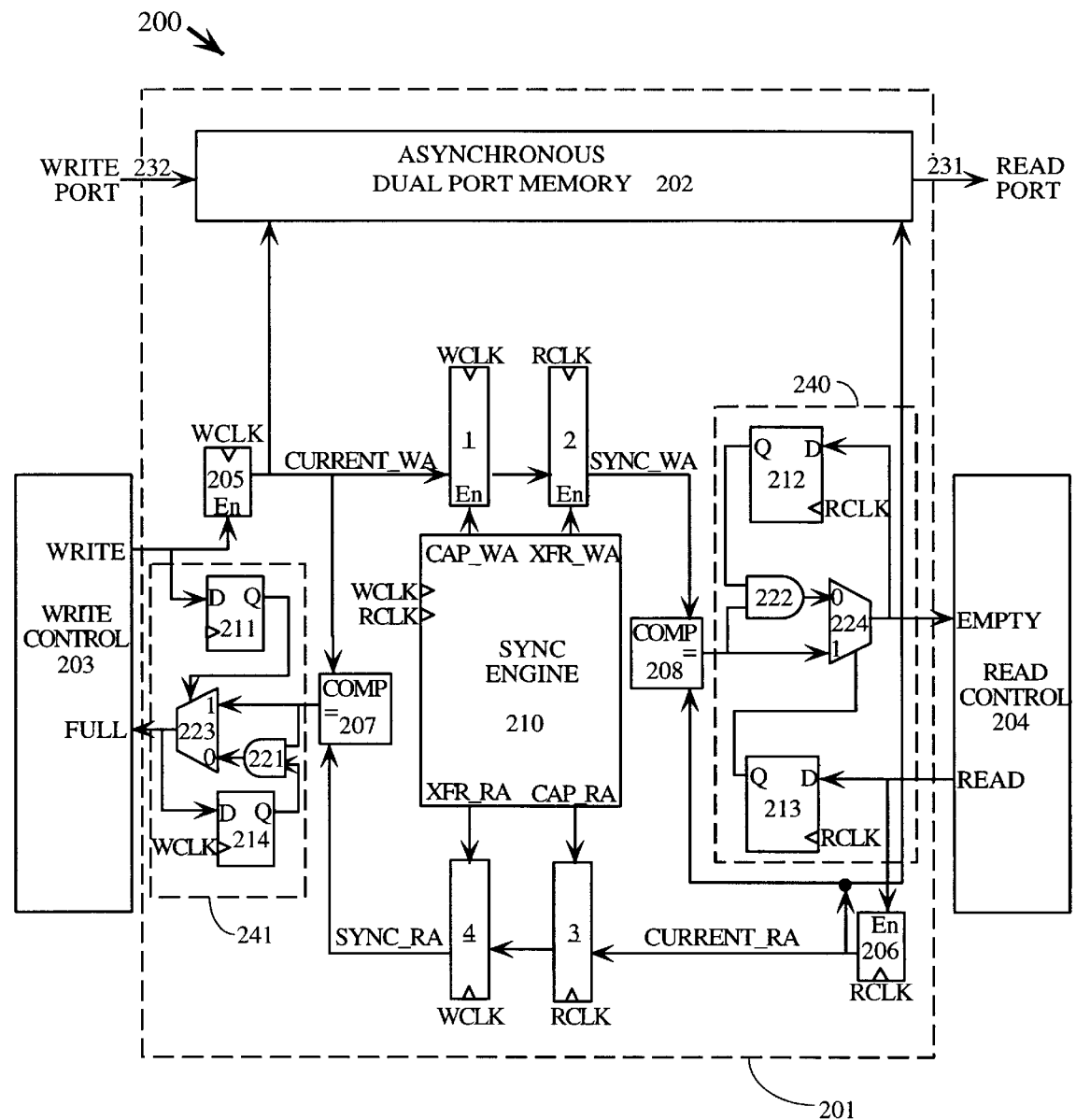
FIG. 2 is a schematic diagram of a memory system in accordance with one embodiment of the invention.

FIG. 2 is a schematic diagram of a memory system 200 in accordance with one embodiment of the invention. Memory system 200 includes a first in, first out (FIFO) memory 201, a write control circuit 203 and a read control circuit 204. The FIFO memory 201 includes an asynchronous dual-port memory 202, a write address counter 205, a read address counter 206, comparators 207 and 208, a synchronization engine 210, an EMPTY flag generation circuit 240, a FULL flag generation circuit 241, write address registers 1 and 2, and read address registers 3 and 4. EMPTY flag generation circuit 240 includes D flip flops 212 and 213, AND gate 222 and multiplexer 224. FULL flag generation circuit 241 includes D flip flops 211 and 214, AND gate 221 and multiplexer 223. Read control circuit 204 and write control circuit 203 control the operation of FIFO memory 201.

Dual-port memory 202 is, for example, a conventional RAM-based memory having a read port 231 and a write port 232. Data values provided at write port 232 are written to locations within dual-port memory 202 as identified by a current write address CURRENT_WA generated by write address counter 205. Similarly, data values are retrieved from locations within dual-port memory 202 as identified by a current read address CURRENT_RA. These retrieved data values are provided to read port 231. These read and write operations can be performed simultaneously within dual-port memory 202. The write operations are synchronized with a write clock (WCLK) signal, and the read operations are synchronized with a read clock (RCLK) signal. The WCLK signal and the RCLK signal are asynchronous with respect to one another. That is, the WCLK and RCLK signals have different frequencies and/or unknown phase relationships.

Memory system 200 operates as follows. When a write operation is to be performed, write control circuit 203 enables write address counter 205 by asserting a logic high WRITE signal which is applied to the enable input terminal of write address counter 205. The enabled write address counter 205 is subsequently incremented by the WCLK signal. The value currently stored in the write address counter 205 is provided to the dual-port memory 202 as a write address signal CURRENT_WA. The CURRENT_WA signal, which is synchronized with the WCLK signal, represents the current write address of dual-port memory 202.

The CURRENT_WA signal is also provided to write address register 1 and to comparator 207. The CURRENT_WA signal is written into write address register 1 in synchronism with the WCLK signal when the write address register 1 is enabled. Write address register 1 is enabled by a capture write address (CAP_WA) signal generated by synchronization engine 210. The CURRENT_WA signal is subsequently written to write address register 2 from write address register 1 in synchronism with the RCLK signal when the write address register 2 is enabled. Write address register 2 is enabled by a transfer write address (XFR_WA) signal generated by synchronization engine 210. The operation of synchronization engine 210 is described in more detail in connection with FIG. 3.

After the CURRENT_WA signal is written to write address register 2, this signal is referred to as the synchronized write address (SYNC_WA) signal (since this write address signal is synchronized with the RCLK signal). The SYNC_WA signal may or may not be the same as the CURRENT_WA signal. Because of the synchronization latency which exists between write address registers 1 and 2, by the time that the SYNC_WA signal is provided by register 2, the CURRENT_WA signal could be incremented by a subsequent write operation. Thus, the SYNC_WA signal can lag the CURRENT_WA signal under certain conditions.

The SYNC_WA signal is provided to an input terminal of comparator 208. The other input terminal of comparator 208 is coupled to receive a current read address (CURRENT_RA) signal from read address counter 206. Read address counter 206 generates the CURRENT_RA signal in synchronism with the RCLK signal. Read address counter 206 is enabled in response to a logic high READ signal which is received from read control circuit 204. Read control circuit 204 asserts a logic high READ signal when a read operation is to be performed within dual-port memory 202. The CURRENT_RA signal, which is synchronized with the RCLK signal, represents the current read address of dual-port memory 202.

Comparator 208 monitors the SYNC_WA and CURRENT_RA signals to determine when the SYNC_WA signal is equal to the CURRENT_RA signal. When such an equality exists, comparator 208 provides a logic high output signal to EMPTY flag generation circuit 240. EMPTY flag generation circuit 240 asserts the EMPTY flag when the SYNC_WA equals the CURRENT_RA signal as a result of a read operation. EMPTY flag generation circuit 240 operates as follows. The logic high output of comparator 208 is provided to the "1" input terminal of multiplexer 224 and to a first input terminal of AND gate 222. If the equality of the SYNC_WA and CURRENT_RA occurred as the result of a read operation, the logic high READ signal associated with the read operation will be stored in flip flop 213. The Q output terminal of flip flop 213 is coupled to provide this logic high signal to the control terminal of multiplexer 224. As a result, the logic high output signal from comparator 208 is routed through multiplexer 224 to read control circuit 204 as a logic high EMPTY flag. An empty condition is thereby identified, and read control circuit 204 does not initiate further read operations until the EMPTY flag transitions to a logic low state.

The EMPTY flag remains asserted as follows. Because read control circuit 204 does not initiate any read operations in the presence of the logic high EMPTY flag, a logic low value is provided to the control terminal of the multiplexer 224. Consequently, the output signal from AND gate 222 is provided as the EMPTY flag. Flip-flop 212 feeds the logic high EMPTY flag back to the second input terminal of AND gate 222. The logic high output signal provided by the comparator 208 is provided to the first input terminal of AND gate 222. As a result, the EMPTY flag is asserted high until the SYNC_WA signal is incremented (in response to a write operation). When the SYNC_WA signal is incremented, the comparator 208 generates a logic low output signal in response to the inequality detected by the comparator 208. This logic low output signal causes the output signal of AND gate 222 (i.e., the EMPTY flag) to transition to a logic low state.

The EMPTY flag therefore transitions to a logic low state when the SYNC_WA signal is incremented. This may occur as early as the next cycle of the RCLK signal, when the CURRENT_WA signal is transferred to write address register 2 as the SYNC_WA signal. The time required for the CURRENT_WA signal to be transferred as the SYNC_WA signal is referred to as the write address synchronization latency. The EMPTY flag may be asserted high unnecessarily during the write address synchronization latency, since comparator 208 may not have access to the most current write address during this time.

Unnecessarily asserting the EMPTY flag introduces a slight operating latency, but does not result in the destruction of data values within dual-port memory 202. Rather, an unnecessarily asserted EMPTY flag temporarily prevents one or more of the last data values from being read from dual-port memory 202. Advantageously, the write address synchronization latency only results in an operating latency when dual-port memory 202 is almost empty. Dual-port memory 202 can be completely emptied after the write address synchronization latency expires.

Returning now to the discussion of comparator 208, if the equality of the SYNC_WA and CURRENT_RA signals occurs as a result of a write operation, flip flop 213 provides a logic "0" value to the control terminal of multiplexer 224. This causes the output signal provided by AND gate 222 to be routed through multiplexer 224 to read control circuit 204 as the EMPTY flag signal. Because the EMPTY flag signal was previously a "0" value prior to the equality condition, flip flop 212 provides a logic "0" value to the second input terminal of AND gate 222. Consequently, the EMPTY flag has a logic "0" value. This is the desired result, since an equality between the read and write addresses which does not occur as a result of a read operation indicates a full condition, rather than an empty condition.

Read address counter 206 also provides the CURRENT_RA signal to read address register 3. The CURRENT_RA signal is read into read address register 3 in synchronism with the RCLK signal when the read address register 3 is enabled. Read address register 3 is enabled by a capture read address (CAP_RA) signal generated by synchronization engine 210. The CURRENT_RA signal is subsequently written to read address register 4 (from read address register 3) in synchronism with the WCLK signal when read address register 4 is enabled. Read address register 4 is enabled by a transfer read address (XFR_RA) signal generated by synchronization engine 210. Again, the operation of synchronization engine 210 is described in more detail below in connection with FIG. 3.

After the CURRENT_RA signal is written to read address register 4, this signal is referred to as the synchronized read address (SYNC_RA) signal (since this read address signal is synchronized with the WCLK signal). The SYNC_RA signal may or may not be the same as the CURRENT_RA signal because of the synchronization latency which exists between read address registers 3 and 4. More specifically, when a first read address corresponding to a first read operation is stored as the SYNC_RA signal in register 4, a second read operation can be performed having a corresponding second read address. The second read address is stored in read address register 3 as the CURRENT_RA signal. Under these conditions, the SYNC_RA signal lags the CURRENT_RA signal.

The SYNC_RA signal is provided to an input terminal of comparator 207. The other input terminal of comparator 207 is connected to receive the CURRENT_WA signal. Comparator 207 generates a logic high output signal when the received SYNC_RA and CURRENT_WA signals are equal. When such an equality exists, comparator 207 provides a logic high output signal to FULL flag generation circuit 241. FULL flag generation circuit 241 operates in a manner similar to EMPTY flag generation circuit 240. Thus, a logic high output signal from comparator 207 will be routed through multiplexer 223 to write control circuit 203 only if flip-flop 211 provides a logic high value to the control terminal of multiplexer 223. That is, the FULL flag provided to write control circuit 203 is only asserted high when the equality of the SYNC_RA and CURRENT_WA signals occurs as a result of a write operation.

Upon receiving a logic high FULL flag, write control circuit 203 does not initiate additional write operations until the FULL flag transitions back to a logic low state. The FULL flag is maintained in a logic high state by the feedback system formed by flip-flop 214, AND gate 221 and multiplexer 223. When the SYNC_RA signal is incremented in response to a read operation, the comparator 207 will generate a logic low signal (since an equality is no longer detected by the comparator 207). In response to the logic low output signal provided by comparator 207, AND gate 221 provides a logic low output signal which is routed through multiplexer 223 as a logic low FULL flag.

The FULL flag can transition back to a logic low state as early as the next cycle of the WCLK signal, when the CURRENT_RA signal is transmitted from read address register 3 to read address register 4. The time required for the CURRENT_RA signal to be transferred as the SYNC_RA signal is referred to as the read address synchronization latency. The FULL flag may be asserted high unnecessarily during the read address synchronization latency, since comparator 207 may not have access to the most current read address during this time.

Unnecessarily asserting the FULL flag introduces a slight delay, but does not result in the destruction of data values within dual-port memory 202. Rather, an unnecessarily asserted FULL flag temporarily prevents dual-port memory 202 from being completely filled. Advantageously, the read address synchronization latency only results in a delay when dual-port memory 202 is almost full. Dual-port memory 202 can be completely filled after the read address synchronization latency expires.

Figure 3:
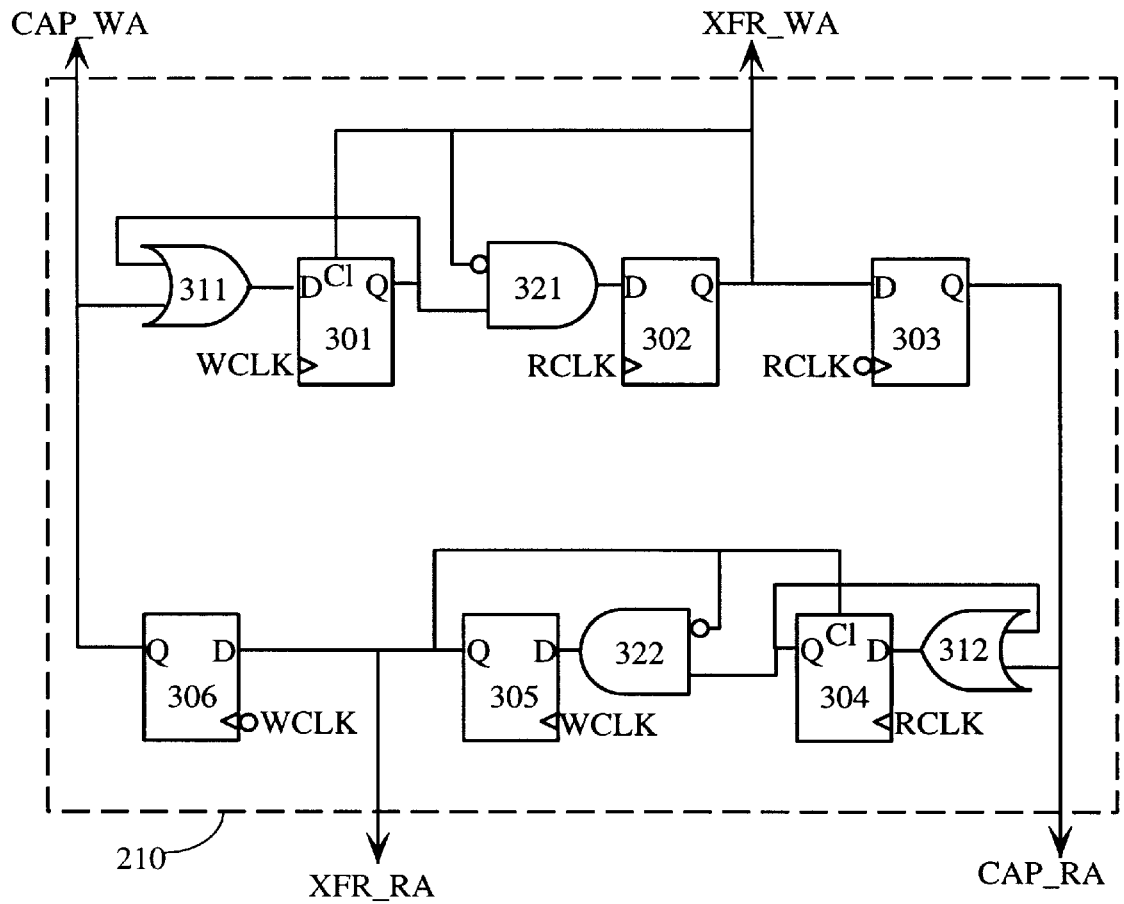
FIG. 3 is a schematic diagram of a synchronization engine for use in the memory system of FIG. 2.

The operation of synchronization engine 210 will now be described. FIG. 3 is a schematic diagram of synchronization engine 210. Synchronization engine 210 includes D flip flops 301–306, OR gates 311–312 and AND gates 321–322, which are connected in a ring configuration. Synchronization engine 210 passes a logic high signal (token) around this ring in a clockwise direction. The Q output terminals of flip flops 306, 302, 303 and 305, which are connected to the enable input terminals of respective registers 1, 2, 3 and 4, (FIG. 2) provide the respective CAP_WA, XFR_WA, CAP_RA and XFR_RA signals. Synchronization engine 210 is initialized such that one of the six output signals from flip flops 301–306 has a logic high value and the five remaining signals have logic low values. For purposes of description, it is assumed that the CAP_WA signal is initialized to have a logic high value, and that the XFR_WA, CAP_RA and XFR_RA signals are initialized to have logic low values. That is, flip flops 301–305 are loaded with logic low values and flip flop 306 is loaded with a logic high value.

As previously discussed in connection with FIG. 2, the logic high CAP_WA signal enables write address register 1, such that the CURRENT_WA signal is written into write address register 1 on a rising edge of the WCLK signal. The logic high CAP_WA signal is also provided to an input terminal of OR gate 311, thereby causing OR gate 311 to provide a logic high output signal to the D input terminal of flip flop 301. This logic high output signal is clocked into flip flop 301 by the rising edge of the WCLK signal.

Once clocked into flip flop 301, this logic high signal is provided at the Q output terminal of flip flop 301. This logic high Q output signal is thereby applied to the other input terminal of OR gate 311 and to a noninverting input terminal of AND gate 321. An inverting input terminal of AND gate 321 is connected to receive the XFR_WA signal, which has a logic low value. As a result, AND gate 321 provides a logic high signal to the D input terminal of flip flop 302.

During the next falling edge of the WCLK signal, the logic low XFR_RA signal is clocked into flip flop 306, thereby causing the CAP_WA signal to transition to a logic low value. The feedback loop provided by OR gate 311 assures that flip flop 301 continues to provide a logic high Q output signal to the non-inverting input of AND gate 321 until the logic high output signal provided by AND gate 321 is captured in flip flop 302 and a logic high signal is provided to the asynchronous CLEAR input terminal of flip flop 301.

During the next rising edge of the RCLK signal, the logic high signal provided by AND gate 321 is clocked into flip flop 302, thereby causing the XFR_WA signal to transition to a logic high value. In this manner, the XFR_WA signal is synchronized with the RCLK signal. As previously discussed, the logic high XFR_WA signal enables write address register 2, such that the CURRENT_WA signal is written into write address register 2 as the SYNC_WA signal on the rising edge of the RCLK signal.

The logic high XFR_WA signal is provided to the CLEAR input terminal of flip flop 301, thereby causing a logic low value to be stored in flip flop 301. The logic low value stored in flip flop 301 is provided to the noninverting input of AND gate 321, thereby causing AND gate 321 to provide a logic low value to the D input terminal of flip flop 302. Thus, on the next rising edge of the RCLK signal, a logic low value is clocked into flip flop 302, thereby causing the XFR_WA signal to transition to a logic low value. The logic high XFR_WA signal is also provided to the D input terminal of flip flop 303. This logic high signal is clocked into flip flop 303 by the falling edge of the RCLK signal, thereby providing a logic high CAP_RA signal at the Q output terminal of flip flop 303. As previously discussed, the logic high CAP_RA signal enables read address register 3, such that the CURRENT_RA signal is written into read address register 3 on a rising edge of the RCLK signal.

Flip flops 304, 305 and 305, AND gate 322 and OR gate 312 are connected in substantially the same manner as previously described flip flops 301, 302 and 303, AND gate 321, and OR gate 311. As a result, the logic high signal provided at the Q output terminal of flip flop 303 is clocked into flip flop 304 on the subsequent rising edge of the RCLK signal. This logic high signal is then clocked into flip flop 305 on the next rising edge of the WCLK signal, thereby providing a logic high XFR_RA signal. Finally, the logic high signal is clocked into flip flop 306 at the next falling edge of the WCLK signal, thereby completing one cycle of synchronization engine 210. The previously described cycle is repeated such that synchronization engine 210 sequentially asserts the CAP_WA, XFR_WA, CAP_RA and XFR_RA signals in synchronism with the WCLK and RCLK signals.

The sequential assertion of the CAP_WA, XFR_WA, CAP_RA and XFR_RA signals ensures that once a CURRENT_WA signal is written into write address register 1, this CURRENT_WA signal can not be overwritten until this CURRENT_WA signal is transferred to write address register 2. This sequential assertion also ensures that once a CURRENT_RA signal is written into read address register 3, this CURRENT_RA signal can not be overwritten until this CURRENT_RA signal is transferred to read address register 4.

Figure 4:
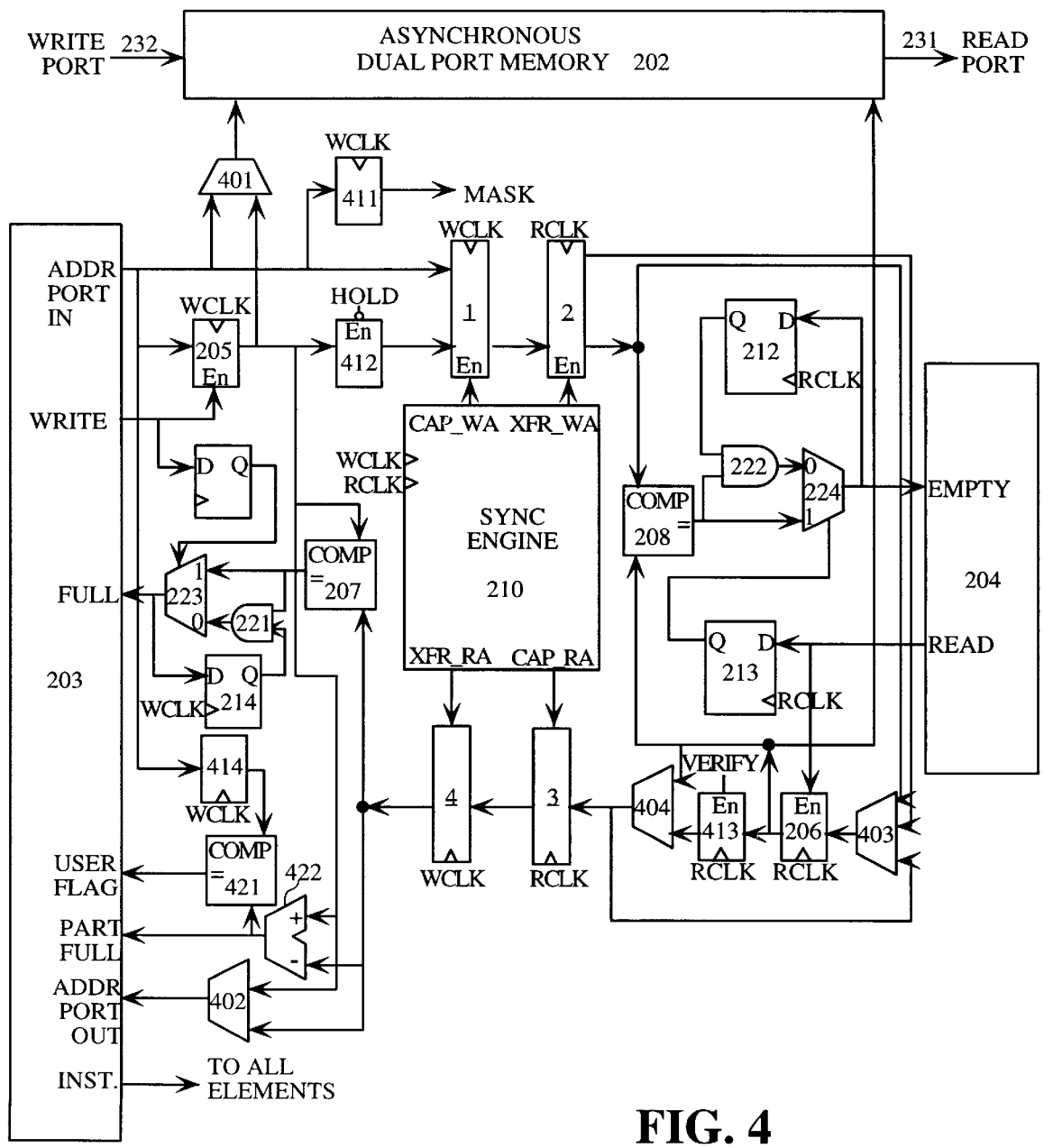
FIG. 4 is a block diagram of a memory system which includes circuitry to support additional features.

FIG. 4 is a block diagram of a memory system 400 which includes circuitry to support additional features. Because memory system 400 is similar to memory system 200, corresponding elements in memory systems 400 and 200 are labeled with the same reference numbers. In addition to the elements previously described in connection with memory system 200, memory system 400 additionally includes multiplexers 401–404, registers 411–414, comparator 421 and subtraction circuit 422. Write control circuit 203 has been modified to include additional ports for an input address, an output address, a user flag, a partially full flag, and instructions. Write address registers 1 and 2 have also been modified such that these registers can be loaded directly from the address input port of write control circuit 203. The manner in which the write address registers 1 and 2 are loaded is determined by instructions provided by write control circuit 203. For simplicity, the address and instruction ports of memory system 400 are assumed to be synchronous with the write port 232 of dual-port memory 202.

In memory system 400, both write address counter 205 and read address counter 206 can be loaded from the address input port of write control circuit 203. Read address register 206 is loaded by routing the desired read address directly from write control circuit 203 through write address registers 1 and 2 and multiplexer 403. Multiplexer 403 is controlled by instructions provided by write control circuit 203. When the read address is routed through write address register 2, the read address is synchronized with the RCLK signal in the manner previously described in connection with memory system 200. Dissimilar addresses which define a block of data values can be loaded into write address counter 205 and read address counter 206. This enables the block of data values to be written into (or read from) dual-port memory 202. Alternatively, both the write address counter 205 and the read address counter 206 can be loaded with the same address value. The FULL and EMPTY flags can be set internally within the write control circuit 203 to achieve the desired operating results.

For example, a first address can be loaded to write address counter 205 and a second address can be loaded into read address counter 206, wherein the first and second addresses define a block of addresses within dual-port memory 202. The FULL and EMPTY flags will not be set if the addresses are not the same. If the addresses are the same, then one flag is set as instructed by the user. If the EMPTY flag is not set, then read operations may be performed starting at the second address. Conversely, if the FULL flag is not set, then write operations may be performed starting at the first address.

Address pointer mask register 411 can also be loaded from the address input port of write control circuit 203 in response to an instruction provided by the write control circuit 203. Address pointer mask register 411 is loaded with a value which contains all zeroes except for "n" contiguous ones at the most significant bit positions. These contiguous ones inhibit counting at the corresponding "n" most significant bit positions of write address counter 205 and read address counter 206, thereby restricting the accessible (active) area of dual-port memory 202 to a binary subset of the total area of dual-port memory 202. In effect, dual port memory 202 is divided into $2^n$ subsets (or segments), with each segment being addressed by the upper "n" bits of the address. The accessible segment is determined by the "n" most significant address bits previously loaded into write address counter 205 and read address counter 206. Mask register 411 is shared by both the write address counter 205 and the read address counter 206. No synchronization is provided, since the value provided by mask register 411 is static during operation of memory system 400.

For example, if "n" is equal to two, then the dual-port memory 202 is divided into four segments. The first segment is active when the addresses loaded into the write address counter 205 and the read address counter 206 have two most significant bits of "00". Similarly, the second, third and fourth segments are active when the addresses loaded into the write address counter 205 and the read address counter 206 have two most significant bits of "01", "10" and "11", respectively. Once the write and read address counters 205, 206 have been loaded (thereby defining the active memory segment), the two most significant bits stored in the write and read address counters 205, 206 will not change until new address values are loaded into these counters 205, 206.

Multiplexer 401 enables random-access write operations to be performed to dual-port memory 202. The write address is provided from the address input port of write control circuit 203, through multiplexer 401, to dual-port memory 202. Multiplexer 401 otherwise passes the CURRENT_WA signal from write address counter 205 to dual-port memory 202. Multiplexer 401 is controlled by an instruction received from write control circuit 203. Similar circuitry (not shown) could be included in memory control circuit 400 to enable random-access read operations. When dual-port memory 202 is segmented using the mask register 411, the random-access write operation permits data values to be written to temporarily inactive segments of dual-port memory 202.

Bookmark latch 412 stores an address value which effectively marks the end of a data block, and permits data values for a new data block to be written to dual-port memory 202 before all of the data values in the original block have been read. Prior to entering the data values of the new data block, write control circuit 203 applies a logic high hold instruction to the inverting enable port of bookmark latch 412, thereby preventing register 412 from storing updated CURRENT_WA signals. As a result, the value of the SYNC_WA signal, which is used to generate the EMPTY flag, is frozen. The EMPTY flag is asserted after the entire original block has been read from dual-port memory 202. While the hold instruction is asserted, write address counter 205 increments normally while data values of the second data block are written to dual-port memory 202. Thus, the FULL flag is generated normally as previously described in connection with memory system 200. When the hold instruction is de-asserted low, the CURRENT_WA signal from write address counter 205 is written to register 412, and subsequently becomes available to comparator 208 so that the EMPTY flag can be cleared.

In an alternative embodiment not shown, bookmark latch 412 is placed at the output of synchronizing register 2.

As previously discussed, write control circuit 203 provides instructions to control multiplexer 403. Write control circuit 203 can thereby cause the SYNC_WA signal from write address register 2 (which was previously routed through write address counter 205, bookmark latch 412 and write address register 1) to be loaded into read address counter 206. This causes the EMPTY flag to be asserted, and makes memory locations that were previously waiting to be read available for writing (i.e., "flushes" data values from dual-port memory 202). If the hold instruction is asserted high, only the data values which were written to dual-port memory 202 prior to asserting the hold instruction will be flushed. This is because the SYNC_WA signal loaded through multiplexer 403 into read address counter 206 is received from bookmark latch 412. If the entire dual-port memory 202 is to be flushed, the hold instruction must be de-asserted low before write control circuit 203 causes the SYNC_WA signal to be written to read address counter 206.

When data values are read from locations within dual-port memory 202, these locations can be protected from being overwritten with new data values until after correct transmission of these data values has been verified. Back-up register 413 enables this function. Back-up register 413, which is enabled in response to a verify instruction received from read control circuit 201, operates in a manner similar to bookmark latch 412. Back-up register 413 prevents the CURRENT_RA signal from being passed from read address counter 206 to read address register 3 when the verify instruction is de-asserted low. This prevents the SYNC_RA signal provided by read address register 4 from being incremented. Consequently, addresses which are read after de-asserting the verify instruction do not become available for rewriting until the verify instruction is asserted. Read control circuit 201 further generates an instruction which controls multiplexer 404 to pass the appropriate read address signal to read address register 3. Alternatively, as discussed above with respect to bookmark latch 412, back-up register 413 can be placed at the output of synchronizing register 4.

The SYNC_WA and CURRENT _RA signals can be routed to the output address port of write control circuit 203 through multiplexer 402. When dual-port memory 202 is segmented, these SYNC_WA and CURRENT_RA signals permit memory system 400 to determine the absolute location of data values within a segment for later random-access reading. Multiplexer 402 is controlled by an instruction provided by the write control circuit 203.

The CURRENT_WA and SYNC_RA signals are provided to positive and negative input terminals of subtraction circuit 422. The output of subtraction circuit 422 is therefore a difference value which is equal to difference between the current write address and the synchronized read address. The difference value is used to determine the number of data values stored in dual-port memory 202. The most significant two bits of the difference value which are not masked by mask register 411 are provided to write control circuit 203 and used to generate ¼, ½ and ¾ full flags.

Write control circuit 203 can load a user-defined value into user-flag register 414. The user-defined value stored in register 414 is provided to comparator 421, which compares the user-defined value with the difference value from subtraction circuit 422. When the difference value equals or exceeds the user-defined value, the user flag signal is asserted by comparator 421.

In accordance with one embodiment of the invention, memory system 400 can be operated as follows. The address pointer mask register 411 is loaded such that two or more memory segments are defined within the dual-port memory 202. A first address is loaded into write address counter 205 and a second address is loaded into read address counter 206. The first and second addresses are present within a first segment of the dual-port memory 202. Memory system 400 is then operated as a FIFO memory within the first segment in the manner previously described. In parallel, random access write operations are performed to a second segment of the dual port memory 202. The write address counter 205 and the read address counter 206 are subsequently re-loaded with a third address and a fourth address, respectively, wherein the third and fourth addresses are present within the second segment of the dual-port memory 202. Memory system 400 can then be operated as a FIFO memory within the second segment of the dual-port memory 202. In the described embodiment, the FIFO memory within the second segment of the dual-port memory 202 is effectively pre-loaded by performing the random access write operations. This mode of operation effectively enables the parallel use of two or more FIFO memories within memory system 400. This mode of operation is particularly useful to enable a burst mode to be implemented. Thus, the burst data values are initially written to the second segment of the dual-port memory 202 using random access write operations. After all of the data values of the data burst are stored in the dual-port memory 202, the second segment of the dual-port memory 202 is activated, thereby enabling the data values to be read out in a burst mode.

In another embodiment, FULL and EMPTY flags are generated, not by determining whether a read or write operation caused the addresses to be equal, but by determining whether the memory was almost full or almost empty shortly before the addresses became equal. A structure that performs such logic is described by Alfke in commonly assigned U.S. Pat. No. 5,758,192 issued May 26, 1998, entitled FIFO Memory System and Method for Controlling Same. This related application is incorporated herein by reference.

Although the invention has been described in connection with several embodiments, it is understood that this invention is not limited to the embodiments disclosed, but is capable of various modifications which would be apparent to one of ordinary skill in the art. For example, in the described memory systems can be integrated on a single chip or fabricated on several chips. The described memory systems can also be implemented using a programmable device such as a field programmable gate array (FPGA). Thus, the invention is limited only by the following claims.

what is claimed is:

1. A memory system comprising:
   a dual-port memory which performs read operations in synchronism with a read clock signal and write operations in synchronism with a write clock signal, wherein the read clock signal is asynchronous with respect to the write clock signal;
   a synchronizing circuit which stores a current write address in synchronism with the write clock signal to create a buffered write address, and synchronizes the buffered write address with the read clock signal to create a synchronized write address, and which stores a current read address in synchronism with the read clock signal to create a buffered read address, and synchronizes the buffered read address with the write clock signal to create a synchronized read address;
   an EMPTY flag generator coupled to receive the current read address and the synchronized write address, wherein the EMPTY flag generator generates an EMPTY flag signal when the dual-port memory is empty; and
   a FULL flag generator coupled to receive the current write address and the synchronized read address, wherein the FULL flag generator generates a FULL flag signal when the dual-port memory is full.

2. The memory system of claim 1, wherein the EMPTY flag generator comprises:

a comparator coupled to receive the current read address and the synchronized write address, the comparator determining whether the current read address equals the synchronized write address; and a detector circuit coupled to the comparator, wherein the detector circuit generates the EMPTY flag signal when the current read address equals the synchronized write address as a result of a read operation within the dual-port memory.

3. The memory system of claim 1, wherein the FULL flag generator comprises:

a comparator coupled to receive the current write address and the synchronized read address, the comparator determining whether the current write address equals the synchronized read address; and a detector circuit coupled to the comparator, wherein the detector circuit generates the FULL flag signal when the current write address equals the synchronized read address as a result of a write operation within the dual-port memory.

4. A memory system comprising:

a dual port memory which performs read operations in synchronism with a read clock signal and write operations in synchronism with a write clock signal, wherein the read clock signal is asynchronous with respect to the write clock signal;

a synchronizing circuit which synchronizes a current write address with the read clock signal to create a synchronized write address, and which synchronizes a current read address with the write clock signal to create a synchronized read address;

an EMPTY flag generator coupled to receive the current read address and the synchronized write address, wherein the EMPTY flag generator generates an EMPTY flag signal when the dual port memory is empty; and a FULL flag generator coupled to receive the current write address and the synchronized read address, wherein the FULL flag generator generates a FULL flag signal when the dual port memory is full, wherein the synchronizing circuit comprises:

a first write register connected to receive the current write address;

a second write register connected between the first write register and the first comparator;

a first read register connected to receive the current read address;

a second read register connected between the first read register and the second comparator; and a synchronizing engine coupled to the first and second write registers and to the first and second read registers, wherein the synchronization engine sequentially enables the first write register, the second write register, the first read register, and the second read register.

5. The memory system of claim 4, wherein the synchronization engine enables the first write register and the second read register in synchronism with the write clock signal, and enables the first read register and the second write register in synchronism with the read clock signal.

6. The memory system of claim 4, wherein the first write register and the second read register are coupled to receive the read clock signal and the first read register and the second write register are coupled to receive the write clock signal.

7. The memory system of claim 1, further comprising:

a write address counter for storing the current write address; and a read address counter for storing the current read address.

8. The memory system of claim 7, further comprising: means for loading the synchronized write address into the read address counter.

9. The memory system of claim 7, wherein the write address counter and the read address counter are independently loadable counters.

10. The memory system of claim 1, further comprising means for routing random addresses to the dual-port memory, thereby enabling random accesses to the dual-port memory.

11. The memory system of claim 1, further comprising a mask register which is programmable to segment the dual-port memory into a plurality of memory segments.

12. The memory system of claim 1, further comprising a bookmark latch for holding the synchronized write address at a fixed value.

13. The memory system of claim 1, further comprising a back-up register for holding the synchronized read address at a fixed value.

14. A method of operating a dual-port memory, the method comprising the steps of:

performing read operations in the dual-port memory in synchronism with a read clock signal;

performing write operations in the dual-port memory in synchronism with a write clock signal, wherein the read clock signal is asynchronous with respect to the write clock signal;

storing a current write address in synchronism with the write clock signal to create a buffered write address, and synchronizing the buffered write address with the read clock signal to create a synchronized write address;

storing a current read address in synchronism with the read clock signal to create a buffered read address, and synchronizing the buffered read address with the write clock signal to create a synchronized read address;

generating an EMPTY flag if the synchronized write address equals the current read address and the dual-port memory is empty; and generating a FULL flag if the synchronized write address equals the current read address and the dual-port memory is full.

15. The method of claim 15 wherein the step of generating an EMPTY flag comprises the steps of:

comparing the synchronized write address with the current read address, and generating the EMPTY flag if the synchronized write address equals the current write address as a result of a read operation.

16. The method of claim 14 wherein the step of generating a FULL flag comprises the steps of:

comparing the synchronized read address with the current write address, and generating the FULL flag if the synchronized read address equals the current write address as a result of a write operation.

17. The method of claim 16, further comprising the step of inhibiting read operations from the dual-port memory when the EMPTY flag is generated.

18. The method of claim 16, further comprising the step of inhibiting write operations to the dual-port memory when the FULL flag is generated.

19. The method of claim 14, further comprising the step of setting the current read address to be equal to the synchronized write address.

20. The method of claim 14, further comprising the step of dividing the dual-port memory into a plurality of memory segments.

21. The method of claim 14, further comprising the step of holding the synchronized write address at a fixed value.

22. The method of claim 14, further comprising the step of holding the synchronized read address at a fixed value.

23. The method of claim 14, further comprising the step of accessing the dual-port memory in a random access manner.

* * * * *